July 14, 1931.  C. A. KELLY  1,814,558
DASH SPRING STARTER SWITCH
Filed Dec. 31, 1927
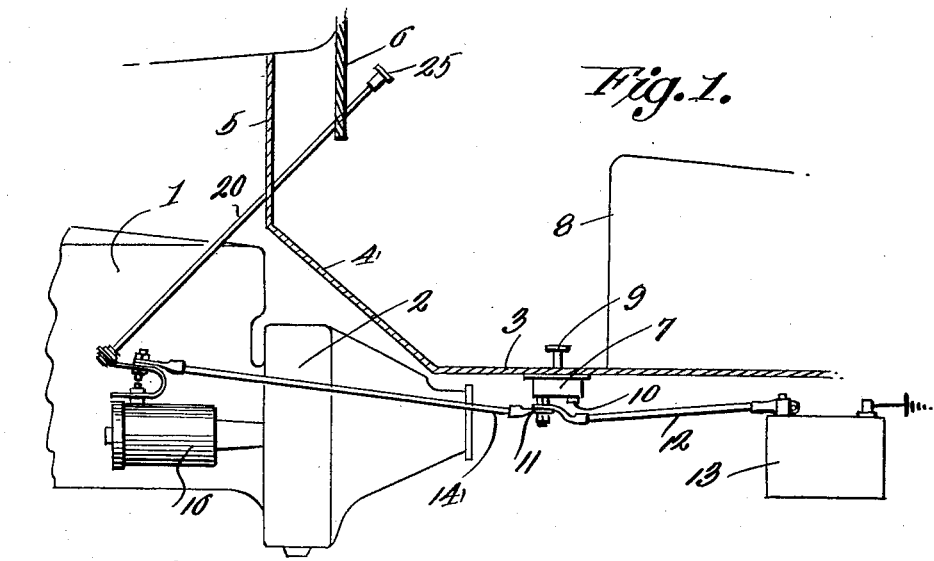
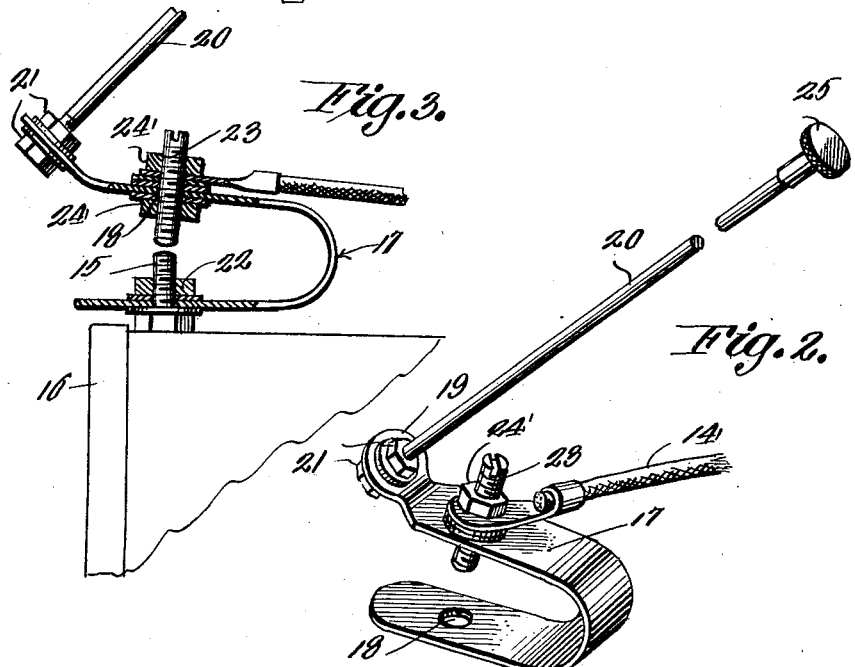
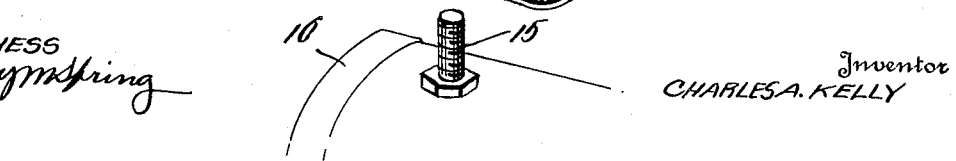
WITNESS
Guy M String
Inventor
CHARLES A. KELLY
By Irving L. McCeathran
Attorney Patented July 14, 1931

1,814,558

UNITED STATES PATENT OFFICE

CHARLES A. KELLY, OF MONROE, WISCONSIN

DASH SPRING STARTER SWITCH

Application filed December 31, 1927. Serial No. 243,893.

This invention relates to the class of circuit makers and breakers and pertains particularly to an electric switch element designed especially for use as a motor vehicle starting switch.

The present invention has for its primary object the provision, in a manner as hereinafter set forth, of a switch device of new and novel design adapted to be placed, when in use as a motor vehicle starting switch, directly upon the starter motor and having means associated therewith to facilitate its operation from a remote point as for example from the seat of the vehicle operator.

As is well known a particular popular make of motor vehicle is supplied with a starter control switch located in the floor adjacent the driver's seat to be operated by the heel of the driver when it is desired to start the motor. The location of the switch device in this position necessitates the cutting of the floor-mat if one is used and further considerable annoyance is often experienced because of the freezing up of the switch in the winter when snow and mud sometimes settles around the switch button during freezing weather. It quite frequently occurs also that the contact points of switches of the character at present in use for this purpose become burnt away and the switch refuses to work necessitating the complete removal and replacement. With the present device the contact members of the switch can be adjusted relative to one another to compensate for any burning away between the terminal points.

The present invention will be best understood from a consideration of the following detailed description taken in connection with the accompanying drawings forming a part of this specification, with the understanding, however, that the invention is not confined to any strict conformity with the showing of the drawings but may be changed or modified so long as such changes or modifications mark no material departure from the salient features of the invention as expressed in the appended claim.

In the drawings:

Figure 1 shows the device embodying the present invention as in use.

Figure 2 is an enlarged side elevational view of the switch structure with portions thereof broken away.

Figure 3 is a detailed perspective view of the switch structure removed from engagement with the starter motor.

Referring now more particularly to the drawings in detail there has been shown diagrammatically in Figure 1 portions of the front of a motor vehicle of the type in connection with which the present starter switch is especially designed for use, the numeral 1 indicating the engine body, 2 the transmission housing, and 3 the forward portion of the vehicle body floor which overlies the transmission housing, the floor at its forward end being inclined as at 4 and extending directly upwardly as at 5 in the usual manner, behind the instrument panel 6.

In the present machines the starting motor control switch which is indicated by the numeral 7 is located in the floor 3 adjacent the front of the driver's seat 8 the switch carrying a button 9 which extends upwardly through the floor for engagement with the heel of the driver. The lower portion of the switch is provided with a pair of contact posts 10 and 11 to one of which, as for example the post 10, one end of the cable 12 connects, the other end of the cable connecting with the vehicle battery 13 the other terminal of the switch of the terminal 11 is normally connected by a cable 14 with the terminal post 15 of the starting motor 16, which motor is located at one side of the engine 1 adjacent the rear of the same as shown.

Applicant's invention consists of an improved switch structure which is designed to be secured to the starting motor terminal 15 in the manner shown in Figures 1 and 2, eliminating the floor switch 7 and having means connected therewith whereby the switch may be controlled from the instrument board of the machine. As shown this switch comprises a substantially U-shaped resilient member 17 which is flat or ribbon like throughout. Each leg of the member 17 is provided with an aperture 18 and one leg has an extension 19 formed integral therewith and turned outwardly at an angle with respect to the length thereof, this extension being apertured to receive one end of the operating bar 20 as shown in the figures of the drawings. The lower end of the bar 20 carrying a pair of clamp nuts 21 which are located to engage opposite faces of the extension 19 to grip the same and to securely hold the bar in position therewith.

When the switch member 17 is placed in position the binding post terminal 15 of the starter motor 16 is extended through the apertures 18 in the leg opposite that upon which the extension 19 is formed, and a securing nut 22 threaded upon the post 15 to bind the switch legs securely thereto. A terminal screw 23, which is threaded throughout its length as shown, is then inserted through the aperture 18 of the other leg and binding nuts 24 threaded thereon upon opposite sides of the switch plate member in the manner shown. The screw 23 is rotated to properly adjust the same with respect to the post 15 after which the free end of the cable 14 is engaged over the screw and top binding nut 24 placed in position. The tightening of the binding nuts 24 will maintain the screw 23 in position in which it is set.

As shown the rod or bar 20 extends upwardly from the switch extension 19 through the straight portion 5 of the body floor and through the panel 6 terminating in the button 25 which appears in the front of the panel 6. The cable 12 which normally connects the battery 13 with post 10 of the switch, is removed and connected to the post 11 of the switch to which the cable 14 is attached thus directly connecting the battery with the upper leg of the switch member 17. From this it will be readily understood that in order to close the switch it is only necessary for the vehicle operator to press downwardly upon the bar 20 thereby compressing the resilient legs of the switch 17 to bring the screw 23 in contact with the motor terminal post 15 thus completing the circuit of the battery through the motor. Upon the release of the bar 20 the terminal contact 23 and 15 will be forced apart through the action of the resiliently connected legs of the switch.

Having thus described my invention what I claim is:

As an article of manufacture, a control switch for an engine starting motor adapted to be mounted directly on said motor comprising a substantially U-shaped resilient body formed from a single strip of material and comprising a pair of parallel legs and a connecting bight portion, the lower leg having an aperture for receiving securing means for connecting said body to the terminal post of the motor, a contact pin extending through and transversely of the upper leg of the member for contact with the terminal post extending through the lower leg when said upper leg is flexed, means for connecting the lead wire of a source of electrical energy directly with said contact pin, an upwardly extending angularly disposed ear formed with and extending from the free end of the upper leg and extending beyond said lower leg, and a push rod connected directly with said ear and disposed at an angle to said upper leg, all as and for the purposes set forth.

In testimony whereof I affix my signature.

CHARLES A. KELLY.